United States Patent [19]

Duesterberg

[11] Patent Number: 5,673,890
[45] Date of Patent: Oct. 7, 1997

[54] HINGE MOUNTING STRUCTURE

[75] Inventor: Marjorie M. Duesterberg, Holland, Mich.

[73] Assignee: Prince Corporation, Holland, Mich.

[21] Appl. No.: 425,406

[22] Filed: Apr. 20, 1995

[51] Int. Cl.[6] ........................................ A47K 1/08
[52] U.S. Cl. ................ 248/311.2; 224/926; 297/188.16
[58] Field of Search .......................... 248/311.2, 291.1, 248/292.14, 118, 201; 224/275, 483, 282, 926; 297/188.16, 188.19; 403/65

[56] References Cited

U.S. PATENT DOCUMENTS

| | | | |
|---|---|---|---|
| 2,598,502 | 5/1952 | Butler | 248/201 X |
| 3,291,317 | 12/1966 | Bowen | 248/201 X |
| 3,472,239 | 10/1969 | Gielow et al. | 224/275 X |
| 3,792,775 | 2/1974 | Riddle et al. | 248/201 X |
| 3,994,465 | 11/1976 | Rudnitzky . | |
| 3,995,742 | 12/1976 | Austin et al. | 248/201 X |
| 4,697,780 | 10/1987 | Wenkman et al. . | |
| 4,733,908 | 3/1988 | Dykstra et al. . | |
| 4,818,017 | 4/1989 | Dykstra et al. . | |
| 4,943,111 | 7/1990 | VanderLaan | 248/311.2 X |
| 4,955,571 | 9/1990 | Lorence et al. . | |
| 5,018,633 | 5/1991 | Toth et al. . | |
| 5,072,989 | 12/1991 | Spykerman et al. . | |
| 5,131,716 | 7/1992 | Kwasnik et al. . | |
| 5,190,259 | 3/1993 | Okazaki . | |
| 5,195,711 | 3/1993 | Miller et al. . | |
| 5,219,140 | 6/1993 | Spykerman . | |
| 5,232,262 | 8/1993 | Tseng . | |
| 5,259,579 | 11/1993 | Schneider . | |

*Primary Examiner*—Ramon O. Ramirez
*Attorney, Agent, or Firm*—Price, Heneveld, Cooper, DeWitt & Litton

[57] ABSTRACT

A container holder is pivotally mounted to an armrest by mateably engageable hinge structures. The first hinge structure is located in a compartment in the armrest near a front wall, and includes a slot and a hole aligned with the end of the slot. The second hinge structure includes first and second protrusions configured to mateably engage the slot and the hole. The container holder is assembled to the armrest by extending the first protrusion into the hole, and then by rotating the container holder to slide the second protrusion into the slot. A detent on the slot holds the second protrusion in position. Further, the leg is U-shaped to mateably engage the front wall of the armrest when the container holder is moved to the extended use position, thereby holding the container holder protrusion in the slot when in the use position. Still further, the armrest includes a cover configured to close on the container holder to further interlockingly hold the second protrusion in the slot when in the use position.

17 Claims, 2 Drawing Sheets

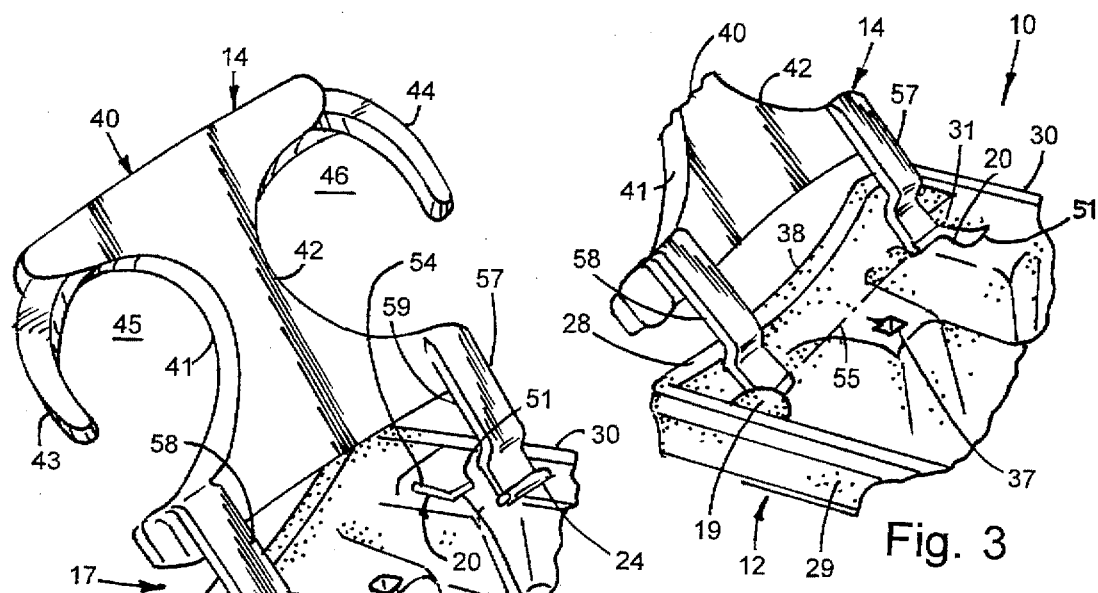
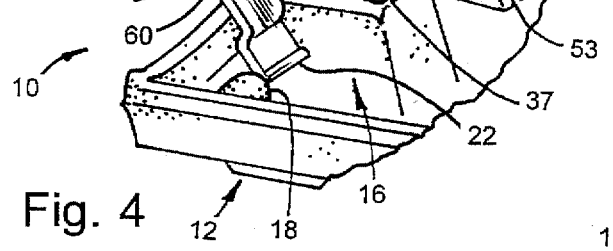
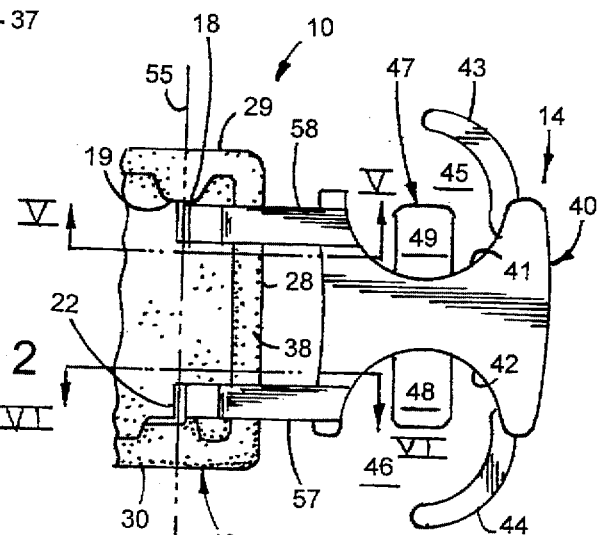
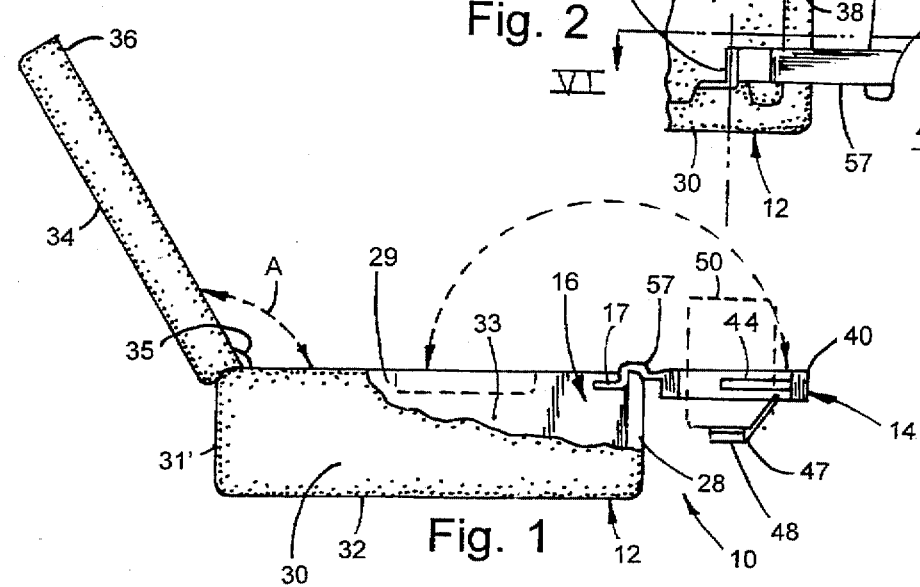

HINGE MOUNTING STRUCTURE

BACKGROUND OF THE INVENTION

The present invention relates to vehicle components, and more particularly a hinge facilitating installation of a container holder into an armrest.

Container holders are often movably secured to an armrest or console for pivotal movement between a storage position in a compartment in the armrest or console, and a use position extending from the compartment. In U.S. Pat. Nos. 5,259,579; 5,195,711; 5,072,989; and 4,818,017 (assigned to the present assignee), installation of the container holders is accomplished by pinching the opposing legs together slightly so that outwardly opposing rod-shaped protrusions on the legs can be aligned with mating holes in opposing sides of the compartment. Once aligned with the holes, the protrusions are released and engage the holes to form pivots for pivotally supporting the container holder. However, it is inconvenient, sometimes difficult, and time consuming to first align, then compress and install the protrusions in the holes. Further, there is a risk of damaging the legs of the container holder if the legs are over-stressed during installation. Thus, a hinge arrangement facilitating installation is desired that also provides reliable and secure engagement.

SUMMARY OF THE INVENTION

The present invention includes a hinge for a vehicle component including a compartment having a first hinge structure located in the compartment, and a functional member including a second hinge structure for mateably engaging the first hinge structure. One of the first and second hinge structure includes a slot and the other includes a protrusion configured to slideably engage the slot to facilitate installation. Once installed, the protrusion rotatably engages an end of the slot so that the functional member is pivotable between first and second positions. In a preferred embodiment, the first hinge structure includes a hole spaced from the slot, and the second hinge structure includes a second protrusion for engaging the hole, the hole and the end of the slot aligned for defining an axis of rotation for the functional member. Further, in a preferred embodiment, the functional member is a container holder having an arm that mateably engages the front wall of the component when in the extended second position, thus locking the protrusion in the end of the slot when the container holder is in use.

In another aspect, the present invention includes a method comprising the steps of providing a container holder and a compartment-defining component each including mateably engageable hinge structures defining a first axis of rotation, one of the hinge structures including a slot and the other hinge structure including a protrusion, and manipulating the container holder to slideably engage the mateably engageable hinge structures including the slot and protrusion in a direction non-parallel to the first axis. In a preferred method, the hinge structure of the container holder rotates into engagement with the hinge structure of the compartment-defining component.

These and other features, advantages and objects of the present invention will be further understood and appreciated by those skilled in the art by reference to the following specification, claims and appended drawings.

BRIEF DESCRIPTION OF THE DRAWINGS

FIG. 1 is a side view of an armrest including a pivotable container holder embodying the present invention;

FIG. 2 is an enlarged fragmentary top plan view of the container holder and armrest shown in FIG. 1;

FIG. 3 is an enlarged fragmentary perspective view of the hinge arrangement shown in FIG. 2;

FIG. 4 is a fragmentary perspective view of the container holder partially installed in the armrest shown in FIG. 1;

DETAILED DESCRIPTION OF PREFERRED EMBODIMENT

Figure 5:
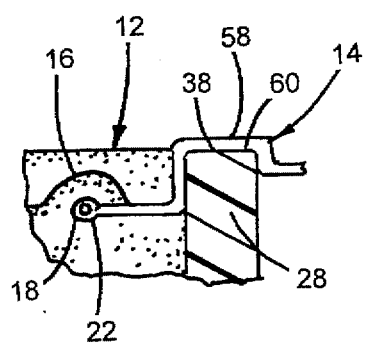
FIG. 5 is an enlarged fragmentary cross-sectional view taken along the plane V—V in FIG. 2.
Figure 6:
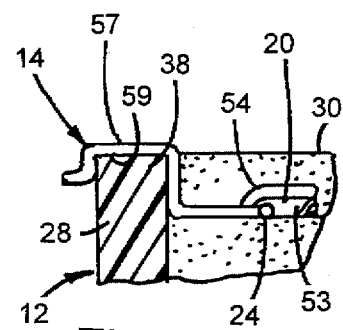
FIG. 6 is an enlarged fragmentary cross-sectional view taken along the plane VI—VI in FIG. 2.

A vehicle accessory 10 (FIGS. 1–4) embodying the present invention includes a compartment-defining component 12, such as an armrest or console, and a container holder 14 pivotally secured to component 12 for movement between a storage position (shown in phantom) and an extended use position. The component 12 includes a hinge structure 16 having a hole or aperture 18 and a slot 20 opposing the hole 18 (FIG. 4). The container holder includes a second hinge structure 17 having opposing rod-shaped protrusions 22 and 24 configured to engage the hole 18 and slot 20, respectively. To assemble container holder 14 to component 12, protrusion 22 is positioned in hole 18 and then the container holder 14 is rotated to slide protrusion 24 into slot 20. This hinge structure facilitates assembly, but is mechanically non-complex, readily manufactured, and provides a secure interconnection.

More particularly, component 12 includes a front wall 28, sidewalls 29 and 30, rear wall 31', and bottom 32 defining a compartment 33. A cover 34 is pivotally mounted to rear wall 32 by a hinge 35. Cover 34 is movable between an open position (shown in FIG. 1) and a closed position wherein the cover 34 engages walls 28, 39, 30, and 31 to enclose compartment 33 in a direction indicated by arrow A in FIG. 1. A latch 36 (FIG. 1) is attached to the front end of cover 34 and engages a latch engaging structure 37 (FIG. 3) in front wall 28 inside compartment 33. The upper edge 38 of from wall 28 is recessed slightly below the upper edge of sidewalls 29 and 30.

Container holder 14 (FIGS. 2 and 4) includes a body 40 defining opposing arcuate surfaces 41 and 42. A pair of arcuately-shaped arms 43 and 44 are pivotally secured to body 40. Arms 43 and 44 are expandable to define a pair of container holder apertures 45 and 46 with surfaces 41 and 42. A bail 47 includes legs 48 and 49 positionable under apertures 45 and 46 for supporting the bottom of containers 50 (FIG. 1) placed in apertures 45 and 46. Bail 47 is operably mechanically connected to arms 43 and 44 by structure inside of body 40 so that when bail 47 is pressed against the underside of body 40, arms collapse toward body 40, thus giving the container holder 14 a narrow width to fit into compartment 33. Contrastingly, when bail 47 is lowered when container holder 14 is in the extended use position, arms 43 and 44 spread apart, to define container holder apertures 45 and 46. Exemplary structure for interconnecting bail 47 and arms 43 and 44 is disclosed in U.S. Pat. No. 5,072,989.

The first hinge structure 16 (FIG. 4) is formed in component 12 adjacent front wall 28 somewhat below upper edge 38. Hinge structure 16 includes a boss 19 having a hole 18 therein which is positioned between sidewall 29 and latch-engaging structure 37. Structure 16 further includes the rearwardly and horizontally extending slot 20 formed in an extension 31 of sidewall 30 and latch-engaging structure 37. The open end 53 of slot 20 includes a detent or narrowed inlet section 51 that makes it slightly narrower than the closed end 54 of slot 20. Optionally, a detent can be included at the closed end 54 to retain protrusion 24 at closed end 54. The open end 53 of slot 20 further is elongated toward sidewall 30. When installed, protrusions 22 and 24 operably engage hole 18 and the closed end 54 of slot 20 to define an axis of rotation 55. Slot 20 extends horizontally, although it is noted that the slot could be extended at an angle if desired.

A leg structure 56 extends from body 40 and includes spaced apart legs 57 and 58 that straddle latch-engaging structure 37 when container holder 14 is in the extended position. Outwardly extending protrusions 22 and 24 are formed at the ends of legs 57 and 58. Legs 57 and 58 are spaced apart a predetermined distance so that protrusions 22 and 24 operably engage hole 18 and slot 20, respectively. Legs 57 and 58 define inverted "U" shapes having recessed lower surfaces 59 and 60 that mateably engage upper edge 38 of front wall 28 when in the extended position.

Container holder 14 is installed into component 12 by positioning body 40 generally above hinge structure 16, and by extending protrusion 22 into hole 18. Container holder 14 is then rotated about an axis of rotation generally perpendicular to axis 55 to slide protrusion 24 into slot 20. As protrusion 24 slides into slot 20, it passes through the narrow open end 53 of slot 20, and is thus frictionally retained in slot 20. Further, since the body 40 of container holder 14 is spaced from protrusions 22 and 24 by legs 57 and 58, body 40 engages compartment sidewalls 29 and 30 and prevents the container holder 14 from accidentally being rotated and disengaged. Also, legs 57 and 58 mateably interlockingly engage front wall 28 when container holder 14 is in the extended use position (FIG. 1). This also prevents protrusion 24 from accidentally being disengaged from slot 20. Still further, cover 34 can be closed when container holder 14 is in the extended position. When cover 34 is closed, latch 36 engages latch-engaging structure 37 between legs 57 and 58 to securely hold container holder 14 in a "down" position. Thus, latch 36 holds cover 34, thus further interlocking the legs 57 and 58 on front wall 28.

A number of variations are contemplated to be within the scope of the present invention. For example, hinge structure 16 could include a pair of slots instead of a hole and a slot. Also, the slot and its mating protrusion, or the hole and its mating protrusion, could be physically reversed, such as by locating the hole on the container holder leg and the protrusion on the armrest detent at closed end of slot. Alternatively, the protrusions could face inwardly, and the slot and hole face outwardly to mate with the re-oriented protrusions. It is also contemplated that a variety of different container holder structures could be incorporated into the functional component. Further, structures other than container holders could be supported by the hinge arrangement, such as coin holders, ash trays, CD or cassette holders, and the like.

Thus, a hinge arrangement is provided that includes a slot and slideably engageable protrusion forming a pivot that is secure, mechanically non-complex, and readily assembled. In the foregoing description, it will be readily appreciated by those skilled in the art that modifications may be made to the invention without departing from the concepts disclosed herein. Such modifications are to be considered as covered by the following claims, unless these claims by their language expressly state otherwise.

The embodiments of the invention in which an exclusive property or privilege is claimed are defined as follows:

1. A hinge mounting structure for vehicle components comprising:

a vehicle component defining a compartment including a first hinge structure positioned in the compartment; and a functional member including a second hinge structure configured to mateably engage said first hinge structure, one of said first and second hinge structures including a slot and a hole spaced from and axially aligned with an end of said slot, and the other of said first and second hinge structures including a first protrusion for telescopingly engaging the hole and a second protrusion configured to slidably engage said slot, the second protrusion being configured to rotatably slidingly engage said slot after said first protrusion is inserted into said hole so that said functional member is readily installable by rotating the functional member about a vertical first axis and is thereafter pivotable between storage and use positions about a horizontal second axis that is generally perpendicular to the first axis.

2. A hinge mounting structure as defined in claim 1 wherein said slot extends horizontally.

3. A hinge mounting structure as defined in claim 1 wherein said functional member comprises a container holder.

4. A hinge mounting structure as defined in claim 3 wherein said functional member includes a leg connecting said protrusion to said container holder and spacing said protrusion from said container holder.

5. A hinge mounting structure as defined in claim 4 wherein said leg is configured to mateably engage a front wall of said vehicle component.

6. A hinge mounting structure as defined in claim 5 wherein said leg is U-shaped for mateably engaging the front wall.

7. A hinge mounting structure as defined in claim 1 wherein said slot includes a narrowed end.

8. A hinge mounting structure as defined in claim 1 wherein said first hinge structure is located adjacent a front wall of said compartment.

9. An apparatus comprising:

a vehicle component; and a container holder including a laterally extending leg, said leg including a first hinge structure and said vehicle component including a second hinge structure for pivotally engaging said first hinge structure, one of said first and second hinge structures including an aperture and a horizontally-extending slot opposing said aperture, and the other including first and second protrusions for engaging said aperture and said slot, respectively, said first protrusion being insertable into said aperture and said second protrusion being configured to slide into said slot, whereby the first and second hinge structures can be operably readily interconnected.

10. An apparatus as defined in claim 9 wherein said slot includes a narrowed end.

11. An apparatus as defined in claim 9 wherein said first hinge structure is located adjacent a front wall of said component.

12. An apparatus as defined in claim 9 wherein said leg mateably engages a front wall of said vehicle component when said container holder is in an extended use position.

13. An apparatus as defined in claim 12 wherein said leg is U-shaped to mateably engage an upper edge of the front wall and said slot extends in a direction toward said front wall below the upper edge of said front wall such that the leg securely mateably engages said front wall and thus is prevented from being removed from said slot when in the extended use position.

14. An apparatus as defined in claim 13 including a cover for covering an upper part of the vehicle component and for engaging said leg when said leg is engaging said front wall.

15. An apparatus comprising:

a vehicle component; and a container holder including a laterally extending leg, said leg including a first hinge structure and said vehicle component including a second hinge structure for pivotally engaging said first hinge structure, one of said first and second hinge structures including an aperture and a horizontally-extending slot opposing said aperture, and the other including first and second protrusions for engaging said aperture and said slot, respectively, said first protrusion being insertable into said aperture and said second protrusion being configured to slide into said slot, whereby the first and second hinge structures can be operably readily interconnected; and said component including a front wall and sidewalls defining a compartment, and including a cover for engaging said component front wall and opposing sidewalls, said cover engaging said leg when said leg is positioned over said front wall.

16. A method comprising steps of:

providing a compartment defining component and a container holder, each including mateably engageable hinge structures for defining a horizontal first axis of rotation for pivoting said container holder between first and second positions, one of said hinge structures including a slot and the other hinge structure including a protrusion for engaging the slot, said one hinge structure including an aperture aligned with a slot and the other hinge structure including a second protrusion; and rotating said container holder about a vertical second axis of rotation perpendicular to said first axis to engage said hinge structures and to thereby assemble the functional member to the component, including sliding the protrusion into the slot in a direction non-parallel said first axis, positioning said container holder generally above said hinge structure in said component before said step of rotating, said step of rotating including positioning said second protrusion in said aperture and then rotating said container holder to move said first protrusion slidingly into said slot.

17. A method as defined in claim 16 wherein said container holder includes a leg for mateably engaging a wall of said component, and interlockingly engaging said leg with said wall when pivoting said container holder to one of said positions to hold said protrusion in said slot.

\* \* \* \* \*